US007665079B1

(12) United States Patent
Yasue et al.

(10) Patent No.: US 7,665,079 B1
(45) Date of Patent: Feb. 16, 2010

(54) PROGRAM EXECUTION METHOD USING AN OPTIMIZING JUST-IN-TIME COMPILER

(75) Inventors: Toshiaki Yasue, Sagamihara (JP); Kazunori Ogata, Fujisawa (JP); Kazuaki Ishizaki, Tokyo-to (JP); Hideaki Komatsu, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1378 days.

(21) Appl. No.: 09/708,159

(22) Filed: Nov. 8, 2000

(30) Foreign Application Priority Data

Nov. 17, 1999 (JP) .................................. 11-326990

(51) Int. Cl.
*G06F 9/45* (2006.01)

(52) U.S. Cl. ...................... 717/160; 717/148; 717/153; 712/241

(58) Field of Classification Search ................. 717/148, 717/140, 151, 159–161; 712/209
See application file for complete search history.

(56) References Cited

U.S. PATENT DOCUMENTS

| | | | | | |
|---|---|---|---|---|---|
| 5,202,995 | A | * | 4/1993 | O'Brien | 717/160 |
| 5,530,866 | A | * | 6/1996 | Koblenz et al. | 717/144 |
| 5,652,889 | A | * | 7/1997 | Sites | 717/144 |
| 5,862,384 | A | * | 1/1999 | Hirai | 717/160 |
| 5,933,635 | A | * | 8/1999 | Holzle et al. | 717/151 |
| 5,940,622 | A | * | 8/1999 | Patel | 717/158 |
| 5,970,249 | A | * | 10/1999 | Holzle et al. | 717/153 |
| 5,978,588 | A | * | 11/1999 | Wallace | 717/159 |
| 5,995,754 | A | * | 11/1999 | Holzle et al. | 717/158 |
| 6,139,199 | A | * | 10/2000 | Rodriguez | 717/159 |
| 6,158,048 | A | * | 12/2000 | Lueh et al. | 717/118 |
| 6,170,083 | B1 | * | 1/2001 | Adl-Tabatabai | 717/158 |
| 6,286,135 | B1 | * | 9/2001 | Santhanam | 717/146 |
| 6,295,642 | B1 | * | 9/2001 | Blandy | 717/148 |
| 6,324,686 | B1 | * | 11/2001 | Komatsu et al. | 717/148 |
| 6,332,216 | B1 | * | 12/2001 | Manjunath | 717/141 |
| 6,412,107 | B1 | * | 6/2002 | Cyran et al. | 717/148 |
| 6,463,582 | B1 | * | 10/2002 | Lethin et al. | 717/158 |
| 6,470,492 | B2 | * | 10/2002 | Bala et al. | 717/128 |
| 6,513,156 | B2 | * | 1/2003 | Bak et al. | 717/151 |
| 6,851,109 | B1 | * | 2/2005 | Alexander et al. | 717/148 |

OTHER PUBLICATIONS

Sun Microsystems, Inc., "The Java HotSpot Performance Engine Architecture", White Paper, Apr. 1999.*

(Continued)

*Primary Examiner*—James Rutten
(74) *Attorney, Agent, or Firm*—William A. Kinnaman, Jr.

(57) ABSTRACT

It is one object of the present invention to provide a program execution method for performing greater optimization. A program execution apparatus according to the present invention performs a transfer from an interpreter process to a compiled code process in the course of the execution of a method. At this time, if no problem occurs when a transfer point is moved to the top of a loop, the transfer point for code is so moved. And when a transfer point is located inside a loop, a point that post-dominates the top of the loop and the transfer point is copied to a position immediately preceding the loop. Then, information for generating recalculation code is provided for the transfer point, and a recalculation is performed.

10 Claims, 9 Drawing Sheets

OTHER PUBLICATIONS

T. Cramer, R. Friedman, T. Miller, D. Seberger, R. Wilson and M. Wolczko, "Compiling Java Just In Time", IEEE Micro, vol. 17, pp. 36-43, May 1997.*

K. Ishizaki, M. Kawahito, T. Yasue, M. Takeuchi, T. Ogasawara, T. Suganuma, T. Onodera, H. Komatsu, and T. Nakatani, "Design, implementation, and evaluation of optimizations in a just-in-time compiler", In ACM 1999 Java Grande Conference, Jun. 1999.*

D. Bacon, S. Graham, and O. Sharp, "Compiler transformations for high-performance computing", ACM Computing Surveys, vol. 26, Issue 4, pp. 345-420, Dec. 1994.*

M. Plezbert and R. Cytron, "Does 'just in time'='better late than never'?" In Proceedings of the SIGPLAN'97 Conference on Programming Language Design and Implementation, Jan. 1997.*

C. Hsieh, M. Conte, T. Johnson, J. Gyllenhaal, and W. Hwu, "Optimizing NET Compilers for Improved Java Performance", Jun. 1997, IEEE Computer, vol. 30 No. 6, pp. 67-75.*

Aho, Sethi, and Ullman, "Compilers: Principles, Techniques, and Tools", 1986, Addison-Wesley, ISBN 0-201-10088-6, Chapter 10.*

Holze, Chambers, and Ungar, "Optimizing Dynamically-Typed Object-Oriented Languages With Polymorphic Inline Caches", 1991, Springer-Verlag Heidelberg, Lecture Notes in Computer Science, vol. 512, ECOOP '91 Proceedings, pp. 21-38.*

Holzle, Chambers, and Ungar, "Debugging Optimized Code with Dynamic Deoptimization", Jun. 1992, ACM SIGPLAN '92, Conference on Programming Language Design and Implementation, pp. 32-43.*

Holzle, and Ungar, "Optimizing Dynamically-Dispatched Calls with Run-Time Type Feedback", Jun. 1994, ACM SIGPLAN '94, Conference on Programming Language Design and Implementation, pp. 326-336.*

Hall, Kennedy, and McKinley, Interprocedural Transformations for Parallel Code Generation, 1991, ACM, Proceedings of the 4th Annual Conference on High-Performance Computing (Supercomputing '91), pp. 424-434.*

Hank, Hwu, and Rau, "Region-Based Compilation: An Introduction and Motivation", 1995, Proceedings of the 28th annual international symposium on Microarchitecture, pp. 158-168.*

Suganuma, Ogasawara, Takeuchi, Yasue, Kawahito, Ishizaki, Komatsu, and Nakatani, "Overview of the IBM Java Just-In-Time Compiler", 2000, IBM Systems Journal, vol. 39, No. 1, pp. 175-193.*

Doug Bell, "Make Java Fast: Optimize!", Apr. 1997, JavaWorld, accessed online Apr. 20, 2004 <http://www.javaworld.com/javaworld/jw-04-1997/jw-04-optimize_p.html>.*

Bodik, Gupta, and Soffa, "Interprocedural Conditional Branch Elimination", Jun. 1997, 1997 ACM SIGPLAN Conference on Programming Language Design and Implementation, pp. 146-158.*

Rajiv Gupta, "Generalized dominators and post-dominators", 1992, Proceedings of the 19th ACM SIGPLAN-SIGACT symposium on Principles of programming languages, ISBN:0-89791-453-8, pp. 246-257.*

Junpyo Lee, Byung-Sun Yang, Suhyun Kim, et al., "Reducing virtual call overheads in a Java VM just-in-time compiler", Mar. 2000, ACM SIGARCH Computer Architecture News, vol. 28 Issue 1, pp. 21-33.*

Steven S. Muchnick, "Advanced Compiler Desing and Implementation", 1997, Morgan Kaufmann Publishers, ISBN 1-55860-320-4, Chapter 7.*

Kazi et al., "Techniques for Obtaining High Performance in Java Programs", Sep. 2000, ACM Computing Surveys, vol. 32, No. 3, pp. 213-240.*

Janssen and Corporaal, "Making Graphs Reducible with Controlled Node Splitting", Nov. 1997, ACM, Transactions on Programming Languages and Systems, vol. 19, No. 6, pp. 1031-1052.*

* cited by examiner

PROGRAM EXECUTION METHOD USING AN OPTIMIZING JUST-IN-TIME COMPILER

BACKGROUND OF THE INVENTION

1. Field of the Invention

The present invention relates to a program execution method for dynamically compiling a program that is created using a programming language, such as Java™. ("Java" is a trademark of Sun Microsystems, Inc.)

2. Description of the Related Art

With the growth in popularity of Java, the importance of providing an environment that is specially suited for the use of a dynamic compiler has increased. For an execution environment for Java in which a dynamic compiler is used, if all program optimization processing, for which an extended period of time is required, is performed at the time a program is initially compiled, depending on the compile time, a reduced processing speed will be attained by the program when it is executed. Therefore, for the initial running of a program, an interpreter is employed, or compiled code is used that was produced rapidly and for which no optimization processing was performed. At this time, data is acquired concerning the execution of the program, such as the execution count and information concerning the performance, including the number of iterations performed by each loop, and this data is subsequently used for optimization. By proceeding in this manner, the rapid execution of a program can be implemented.

A conventional, well known compiling method is one called adaptive compilation, as described in "Optimizing Dynamically-Typed Object-Oriented Programming Languages with Polymorphic Inline Caches," Urs Hoelzle, Craig Chambers and David Ungar, in ECOOP '91 Conference Proceedings, pp. 21-38, Geneva, Switzerland, July 1991, published as Springer Verlag LNCS 512, 1991 [HCU91].

According to this method, compiling is performed substantially without optimization before a program is run the first time, and an invocation counter is employed to count the times the program is activated. Thereafter, when the activation count for a program exceeds a threshold value, an optimization count is incremented and recompiling is performed.

Since with this method a recompiled program is executed only at the time at which the pertinent method is called, the conventional method is not effective for a program that, even though it is activated only once, includes a loop or loops for which iterations are repeatedly performed, and that for its execution requires an extended period of time (includes a loop to be optimized, and a loop for which multiple iterations are performed).

A conventional method called deoptimization is also well known, as described in "Debugging Optimized Code With Dynamic Deoptimization," Urs Hoelzle, Craig Chambers and David Ungar, in Proceedings of the SIGPLAN '92 Conference on Programming Language Design and Implementation, pp. 21-38, June 1992 [HCU92].

According to this method, unoptimized code that is created to debug code for an optimized method, and to perform the debugging of the execution program, is transferred to the obtained code. With this method, (1) before compiling is performed for optimization, interrupt points are designated at two positions: at the beginning of the method and at a branch command near the end of a loop; (2) optimization compiling is performed with an additional restriction that optimization that exceeds an interrupt point will not be performed; (3) when an interrupt is issued during program execution, the execution of the program is resumed following each interrupt point; and (4) a stack frame for the interrupt points is stored. Then, (5) a method is compiled without being optimized; and (6) the stack frame is reproduced in consonance with the non-optimized state, and the process enters an interrupt state. This method is similar to the present invention for transferring the process during the execution of a program. However, since a transfer target is un-optimized code, and since the execution condition, such as a register image, at the transfer point can be uniquely determined using source code, this conventional method can not be applied directly for a transfer to optimized code for which the process at the transfer destination becomes complex.

Further, a conventional well known method is called dynamic recompilation, as described in "Optimizing Dynamical-Dispatched Calls With Run-Time Type Feedback," Urs Hoelzle and David Ungar, in Proceedings of the SIGPLAN '94 Conference on Programming Language Design and Implementation, pp. 326-336, published as SIGPLAN Notices 29(6), June 1994 [HU94].

This method is used to provide an explanation and an overview of a method whereby, during the execution of a non-optimized method, the pertinent method is replaced by one that was optimized when it was compiled. According to this method, (1) a method to be recompiled is detected, (2) a mark is set at a point at which execution is to be resumed, and (3) values that are pointed to by all the currently effective registers are calculated. When these processes have been successfully performed, (4) a non-optimized method in a stack is replaced by an optimized one. If such a replacement is disabled, generated code is called by a succeeding method and is employed. While detailed processing has not been explained for the above method, the following problems have arisen because, as it is described, the processing is the reverse of that performed in deoptimization [HCU92].

The problems with the above method are that a plurality of transfer points are not handled; that optimization passing beyond a transfer point is not performed; and that an increase in memory is not taken into account.

Two methods are available to switch the execution of a program when optimization compiling is performed: a method whereby an execution process is changed by calling the next method, and a method whereby a method that is being executed is replaced by optimized code. The second method, especially, is a function required to increase the processing speed for a method that includes a loop for which multiple iterations are performed, even though it is activated only once, and that for its execution requires an extended period of time. However, when the conventional method, whereby the methods are switched during execution, is employed, the following two problems are encountered.

First, optimization does not pass beyond a position (hereinafter referred to a transfer point) in a method that is to be switched. Therefore, if a transfer point is present, the quality of code obtained is lower than the code that is generated when there is no transfer point. The execution speed for a program when a succeeding method is called is lower than the execution speed obtained when optimization compiling is performed while no transfer point is present.

Especially when a transfer point has been inserted into a loop, optimization of the loop, which can greatly affect the execution performance, can not be performed, and as a result, considerable degradation of the performance occurs.

Second, no consideration is given to a case in a multi-threaded environment in which processes are replaced at a plurality of different transfer points, and compiling is performed each time a transfer occurs. These multiple compiling sessions contribute to the deterioration of the execution speed; generated codes overlap and the consumption of memory is increased.

SUMMARY OF THE INVENTION

To resolve these shortcomings, it is one object of the present invention to provide a program execution method whereby higher optimization that pass beyond a transfer point can be performed, even when in a program a change is made at the transfer point.

It is another object of the present invention to provide a program execution method whereby, even when processes at multiple transfer points in a multithreaded environment are transferred, multiple processing sessions for compiling are not required, and generated codes do not overlap.

To achieve the above objects, according to the present invention, a program execution method, for transferring, from an interpreter process to a compiled code process, a method that is currently being executed for code that includes a plurality of transfer points, comprises the steps of: moving the transfer points for code to the top of a loop process when no problem occurs, even when the transfer points are moved to the top of the loop process; copying to a location immediately preceding the loop process, when the transfer points are located inside the loop process, a point that post-dominates the top of the loop process and the transfer points; storing information for generating recalculation code for specific transfer points when the moving of the code and privatization and a common sub-expression elimination that are performed pass beyond the specific transfer points; and performing a recalculation during a transfer process.

Preferably, the program execution method further comprises a step of: defining as a new transfer point, a point from the interpreter process to the compiled code process whereat, when the method that is currently being executed is replaced, the execution speed is increased compared with when the execution is not transferred.

Preferably, the program execution method further comprises the steps of: generating information required to perform a transfer from the interpreter process to the compiled code process; and storing the obtained information while correlating the obtained information with the transfer points, wherein, at the recalculation step, the information stored for the transfer points is employed.

According to the present invention, a program for transferring, from an interpreter process to a compiled code process, a method that is currently being executed for code that includes a plurality of transfer points, comprises the steps of: moving the transfer points for code to the top of a loop process when no problem occurs, even when the transfer points are moved to the top of the loop process; copying to a location immediately preceding the loop process, when the transfer points are located inside the loop process, a point that post-dominates the top of the loop process and the transfer points; storing information for generating recalculation code for specific transfer points when the moving of the code and privatization and a common sub-expression elimination that are performed pass beyond the specific transfer points; and performing a recalculation during a transfer process.

DESCRIPTION OF THE PREFERRED EMBODIMENT

Figure 1:
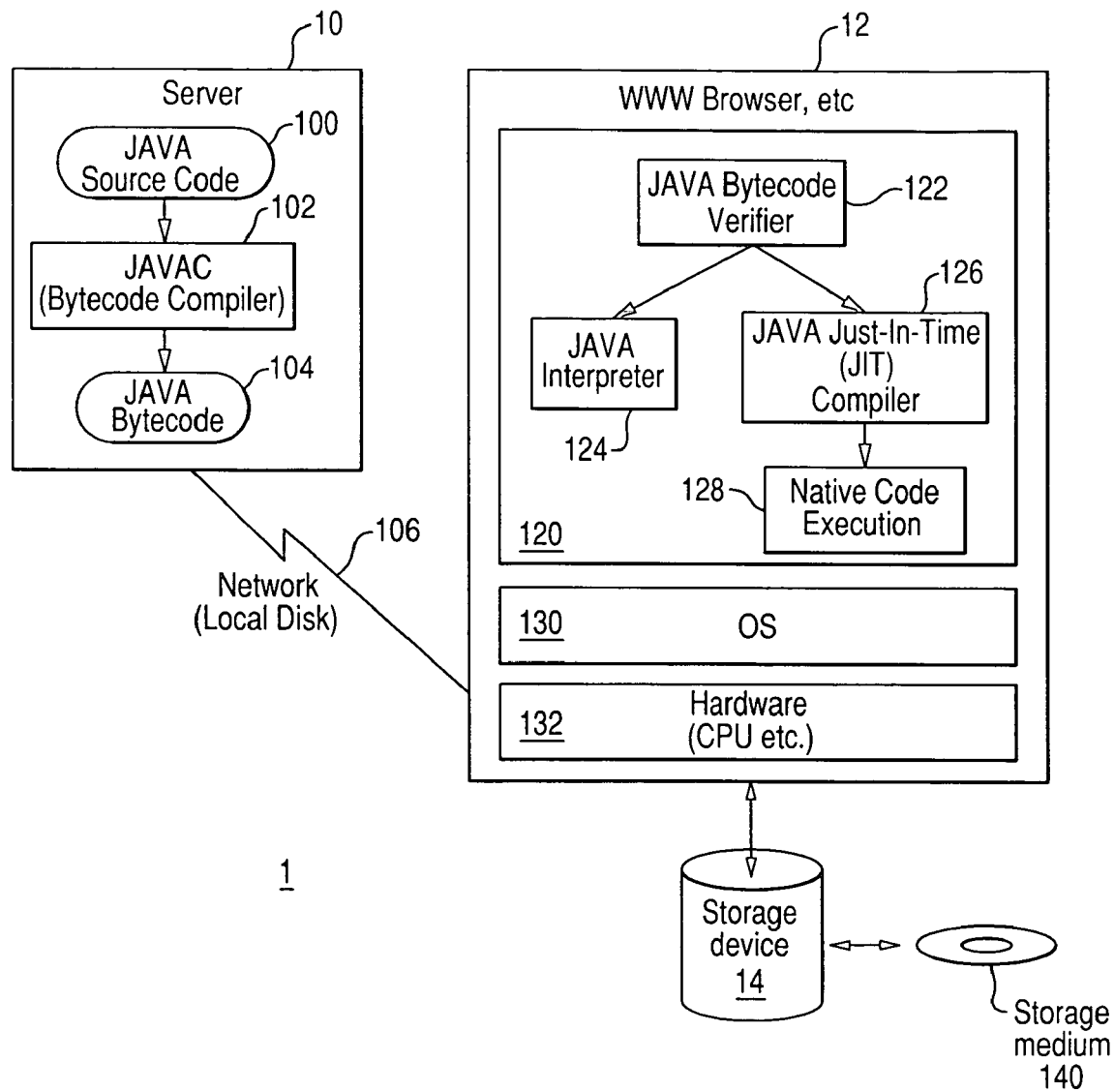
FIG. 1 is a diagram showing the configuration of a program execution apparatus according to the present invention.

The essential points of the present invention will now be described.

Method for Preventing Deterioration of Code Quality Due to the Presence of a Transfer Point When a transfer point is present, there are two reasons the quality of code is deteriorated. One is that many loop optimization processes can not be performed when transfer points are present in a loop. The other is that an optimization method, such as the moving of code, and privatization or common sub-expression elimination, for storing a state in the middle of a calculation in a register or a local area in a memory, can not be performed. The following methods are employed to resolve these problems.

1. If no execution problem occurs, even when a transfer point is moved to the top of a loop, the transfer point in compiled code is moved to the top of a loop.
2. When the transfer point is located inside the loop, the process from the top of the loop to a point that post-dominates the top of the loop and the transfer point is copied to a location immediately preceding the top of the loop, and the loop is so modified that the transfer point is located outside the loop or at the top of the loop. As a result, the presence of the transfer point does not adversely affect the optimization of the loop.
3. When the movement of code and the privatization of the common sub-expression elimination are performed above the transfer point, information for generating recalculated code for the pertinent transfer point is stored at the transfer point. During a transfer process, recalculation is performed.

Method for Employing Code to Cope with a Normal Call and a Transfer in the Middle of the Execution of a Program A point that is to be transferred from the interpreter, and a point that will be transferred as a result of examining a method of a program and that will, as a result of the transfer, increase the processing speed are detected, and are defined as transfer points.

For each transfer point, transfer information, consisting of the register use state at a current transfer, point and recalculation code information are generated. In consonance with the addresses of the original code, a table including the transfer information is generated and is positioned at a location that the method can access. Upon the execution of the transfer process, the table is accessed by using the address of a transfer point as a key, and the transfer information is obtained.

There is one method whereby an unneeded variable area is not generated when a stack frame used by an interpreter is changed to a stack frame that is used by compiled code. According to this method, in the interpreter all the local variables that are designated by the individual methods are allocated to stack frames. However, in the compiled code, a restoration location is shared with a plurality of local variables, or a variable is provided that is stored only in a register and its value is not restored in the stack frame. Therefore, not all the local variables designated by the methods are allocated to the stack frames. To resolve this problem, the following procedure is employed.

A local variable area, in a stack frame that compiled code requires, is stored at a location that a method can access during a compiled code process. The size of this allocated area is no larger than the size required by compiled code. The transfer information includes information concerning whether a variable at a transfer point is stored in the register or in the stack frame. During the transfer process, first, a stack frame that the interpreter is using is restored, and a stack frame for compiled code is generated. Then, the transfer information is employed to copy the values of required local variables to registers or to the stack frame. Finally, the stack frame of the interpreter is removed, and the execution process is shifted to the transfer point. When the interpreter process is changed only once to the execution of machine code, whereby the dynamic compiler is activated, buffer code is generated in a stack area to prevent an increase in the memory consumed by the buffer code.

The processing for the present invention will now be described.

Case Wherein During the Execution Process an Interpreter Determines a Transfer is Required When an interpreter determines during the execution process that a transfer is required, the following processing is performed.
1. If a method has already been compiled, the method is used to prepare a transfer information table to acquire transfer information from the address for a command at a transfer point. When the transfer information can be obtained, process 2 under "Interpreter process" below and the following processes are performed. When the transfer information can not be obtained, the transfer process is halted and the interpreter continues the execution processing.
2. A dynamic compiler is activated. At this time, the address of a transfer determination command and the address of a command to be executed after the transfer has been performed are transmitted to the compiler. When the address of a command to be executed after the transfer has been performed is obvious, this process may be eliminated.

Processing Performed by a Dynamic Compiler

The following process is performed by a dynamic compiler.
1. The code for the method is divided to obtain a Basic Block (hereinafter simply referred to as a BB) and a control flow graph is generated. A transfer point designated by the interpreter is defined as the first in the BB.
2. A mark that includes the transfer point designated by the interpreter is provided for the BB.
3. The code for the method is examined to obtain a proposed transfer point, other than that designated by the interpreter, that can be transferred and that will provide a noticeable effect when the transfer is performed. This process is not performed when the defined transfer point is the point that was designated by the interpreter. The proposed transfer point is obtained by removing, from all the positions in the method that can be detected by the interpreter, locations at which the compiler can determine that no transfer effects will be provided. A point at which no transfer effect will be provided is, for example, a point outside a loop.
4. If no execution problem is encountered, even when the transfer point is moved to the top of the loop, the transfer point in the compiled code is moved to the top of the loop. A case where a problem in a transfer is encountered is one where a write command to a heap area is present, or one where a specific variable is defined between the top of a loop and the transfer point, and a reference for the variable is located between the two and the value of the variable can not be recalculated at the top of the loop. When recalculation can be performed, the recalculation information for the transfer point are generated.
5. If the transfer point is located inside the loop, the loop is modified so that the transfer point serves as the starting point for the loop (a loop to be optimized, including a multiplexed loop). As a result, the presence of the transfer point has no adverse affect on optimization. For this modification, code is copied from the entry point of the loop to the point in the loop that post-dominates the entry point and the transfer point. In a worst case, the copied code is smaller than the code for the loop. Further, when the point to be transferred by the interpreter is limited to a branch command toward the end of a loop, only the control code for the loop need be copied in a Java "for" loop, while no code need be copied for a "do-while" loop.
6. When a process for moving code, or caching values using a common sub-expression or privatization, is performed that passes beyond a transfer point, the data for generating the recalculation code is stored for all the transfer points that are passed.
7. Code consonant with the method is generated.
8. The local variable area used by the compiled code is stored at a location that the method can access.
9. For each transfer point, transfer information are generated that include the code address of the transfer point, recalculation code data for caching, and register employment information for a transfer point. A transfer information table is prepared that is paired with the address of a transfer command in the original code. The table is then stored at a location that the method can access. The transfer information may be represented as actual code, or may be represented as data to be transmitted to the common transfer method. If the interpreter is changed to the execution of machine code only one time, whereat the dynamic compiler is activated, the transfer information can be generated in the stack area, so that the data can be immediately eliminated when the transfer has been completed.

Interpreter Process

The following processes are performed by the interpreter:
1. When the dynamic compiling was successful, the transfer information is obtained from the transfer data table. When the compiling failed, the current transfer process is halted and program execution using the interpreter is continued.
2. The local variable area used for compiled code is obtained, necessary information in the stack frame that was employed by the interpreter is restored, and a stack frame for the compiled code is generated.

3. Necessary information is entered in the stack frame for the code that has been compiled using the transfer information. When the transfer information is represented as code, the code is executed. When the transfer information is represented as data, the data are transmitted to the transfer process method to begin the transfer processing. The transfer processing can be implemented by (1) copying, from a restoring area, a value to be stored in the stack area; (2) recalculating the value using the recalculation information, and entering the result in the local variable area, the register or the restoring area; and (3) loading the value into a register.

4. Program execution is begun at the address of the transfer point.

Program Execution Apparatus 1

FIG. 1 is a diagram illustrating the arrangement of a program execution apparatus 1 according to the present invention.

As is shown in FIG. 1, in the program execution apparatus 1 a server 10 and a client 12 are connected via a network 106.

The server 10 comprises Java source code 100, a Java bytecode compiler (JAVAC) 102 and Java bytecode 104.

The client 12 includes Java programs 120 and 130, which are received from a storage medium 140 and which are executed via a storage device 14 by hardware 132.

The Java program 120 includes a Java bytecode verifier 122, a Java interpreter 124, a JIT compiler 126 and a native code execution block 128.

In the server 10, the Java source code 100 is converted into bytecode 104 by a bytecode compiler, such as the JAVAC 102, and the obtained bytecode is transmitted via the network 106 to the client 12.

In the client 12, the bytecode verifier 122 verifies the bytecode 104 received from the server 10.

The Java interpreter 124 executes the verified bytecode 104 if it is not compiled by the JIT compiler 126.

The JIT compiler 126 compiles the verified bytecode 104 and generates native code.

The native code execution block 128 executes native code that is generated as a result of the compiled code process.

An explanation will now be given for one embodiment wherein the present invention is applied for the Java interpreter 124 and the JIT compiler 126.

The conditions governing the employment of this embodiment are as follows.

The Java interpreter 124 performs a transfer only upon receipt of a command that instructs a branch toward the end of a loop (a loop to be optimized, including a multiplex loop). A flag is set for a command that determines there will be no transfer, and a transfer is prohibited at a succeeding Thread.

It should be noted that after a transfer has been completed, program execution is resumed when a command is issued at the destination for the rearward branch performed in accordance with the command that initiated the transfer.

The Java interpreter 124 does not handle a transfer point at the transfer destination address, but upon the receipt of the rearward branching command that initiated the transfer.

In addition to the rearward branching command, issued when the Java interpreter 124 that activated the JIT compiler 126 determined that the transfer should be effected, the JIT compiler 126 detects, as a transfer point, another source for a rearward branching command for which a flag has not been set and that has not been optimized.

A loop surrounding a transfer point is not to be optimized, and thus the quantity of code that must be copied in order to move the transfer point outside the loop is reduced. This limitation is appropriate for the following reasons. If the surrounding loop is a "for" loop, the transfer is not currently performed because the Java interpreter 124 must determine the condition of the loop by permitting it to perform at least one iteration. Thus, the pertinent loop is assumed to be a loop having few iterations.

The transfer information is then generated as execution code.

To simplify the explanation, it should be noted that, in the code generated by the JIT compiler 126, the local variable area included in the original program is always allocated for a stack frame.

The following terms will be employed in this embodiment.

Transfer point: a point whereat program execution is transferred from the Java interpreter 124 to the JIT compiler 126.

Transfer bwd jump: a rearward branching command used by the Java interpreter 124 to detect a transfer point.

Transfer bwd jump address: an address in a memory wherein a bytecode transfer bwd jump command for a currently executing method is stored.

Transfer point table: a table wherein a transfer bwd jump address and the entry address for pad code are entered as a pair.

Method information (hereinafter simply referred to as mb): a Java structure in which method information is included.

Method compile information (hereinafter simply referred to as minfo): a structure for storing, during a compiled code process, various information concerning a method.

Process Performed by the Java Interpreter 124 (Process 1)

The Java interpreter 124 detects a backedge by which it is immediately transferred to the JIT compiler 126.

If necessary, a value cached in the register is written in the memory.

The JIT compiler 126 is called to compile source code. At this time, the address of the backedge, which triggered the transfer, is transmitted to the JIT compiler 126.

Process Performed by the JIT Compiler 126 (Process 2)

Locking is performed to provide an exclusion process for the compiling.

If the compiling has already been completed when the transfer bwd jump address is received, the transfer point table is examined. When the pertinent transfer point address has been included in the table, the table offset is transmitted as a return value (end).

When the transfer bwd jump address is received, in the method information a flag (hereinafter referred to as a gen_tp flag) is set to represent the execution of a process for the transfer point.

The rearward branches included in the loop are counted, and the transfer point table is allocated.

The bytecode is traversed to build a basic block (hereinafter referred to as a BB) and a loop. When the above flag is set, the following processing is performed.

The BB of the transfer point, which is obtained from the transfer bwd jump data received from the Java interpreter 124, is written in the method information.

A flag that represents the transfer point is set in the BB. The BB wherein this flag is set should not merge with the preceding BB.

At a rearward branch for forming the loop, a command for which a flag indicating no transfer is not set is entered in the transfer point table.

When a transfer point is included in the loop, the following processing is performed.

In accordance with the control flow graph, the code from the top of the loop to the transfer point is traced. During the tracing, whether the next command is present is determined. When the command is not present, the transfer point is moved to the top of the loop.

That is, in accordance with the control flow graph, the code from the top of the loop to the transfer point is traced.

Then, during the tracing process, whether the next command is present is determined. When the command is not present, the transfer point is moved to the top of the loop, and a command for writing data to the heap area is executed to end the processing for moving outside the loop.

Following this, a command for defining the local variable is executed.

Thereafter, the code that extends from the top of the loop to the transfer point is copied to a location outside the loop, and the transfer point is also moved outside.

The common sub-expression elimination process is performed.

When the process is extended across the transfer point, and when the calculation to be removed can be performed by a recalculation using a local variable belonging to the Java interpreter 124, the local variable is registered as recalculation information at the transfer point. When the recalculation can not be performed, the extension of the process across the transfer point is prohibited.

The privatization is performed for the field variable.

When the process is extended across the transfer point, and when the calculation to be removed can be performed by a recalculation using the local variable belonging to the Java interpreter 124, the local variable is registered as recalculation information at the transfer point. When the recalculation can not be performed, the extension of the process across the transfer point is prohibited.

The following processing is performed for code generation.

By using the information contained in the transfer point table for "minfo," a transfer point table wherein code (original code address, transfer code) is entered as an element and a table sized storage area is prepared in the location that can be accessed by the mb. The bytecode address of the transfer point is then written.

The bytecode addresses are rearranged in the ascending order to facilitate the search.

The information contained in the transfer point table and the register image of the transfer point are employed to generate recalculation code for caching and a transfer code for each transfer point (code for storing a value in memory in a register). The generated codes are written in the transfer point table entered as transfer point code addresses.

A work area (a local variable area and a stack area) required by the JIT compiler 126 is a established in a location that can be accessed by the mb.

Process Performed by the Java Interpreter 124 (Process 3)

The return value for the compiler is examined. When the compilation failed, the execution of the Java interpreter 124 is continued (End).

The transfer point table for the mb is obtained to determine whether the table contains a current bwd jump address. When there is no address in the table, the execution of the Java interpreter 124 is continued. (End).

While taking into account the size of a work area received by the JIT compiler 126, the stack frame used for the Java interpreter 124 is converted into one for the JIT compiler 126.

The transfer point table is obtained from the mb.

The transfer point table is obtained, and the transfer point code address is also acquired from the address for the bytecode that is currently being executed.

The program execution is started at the transfer point code address.

The processing performed by the program execution apparatus 1 of the invention will now be described while referring to the flowcharts in FIGS. 2 to 8.

Figure 2:
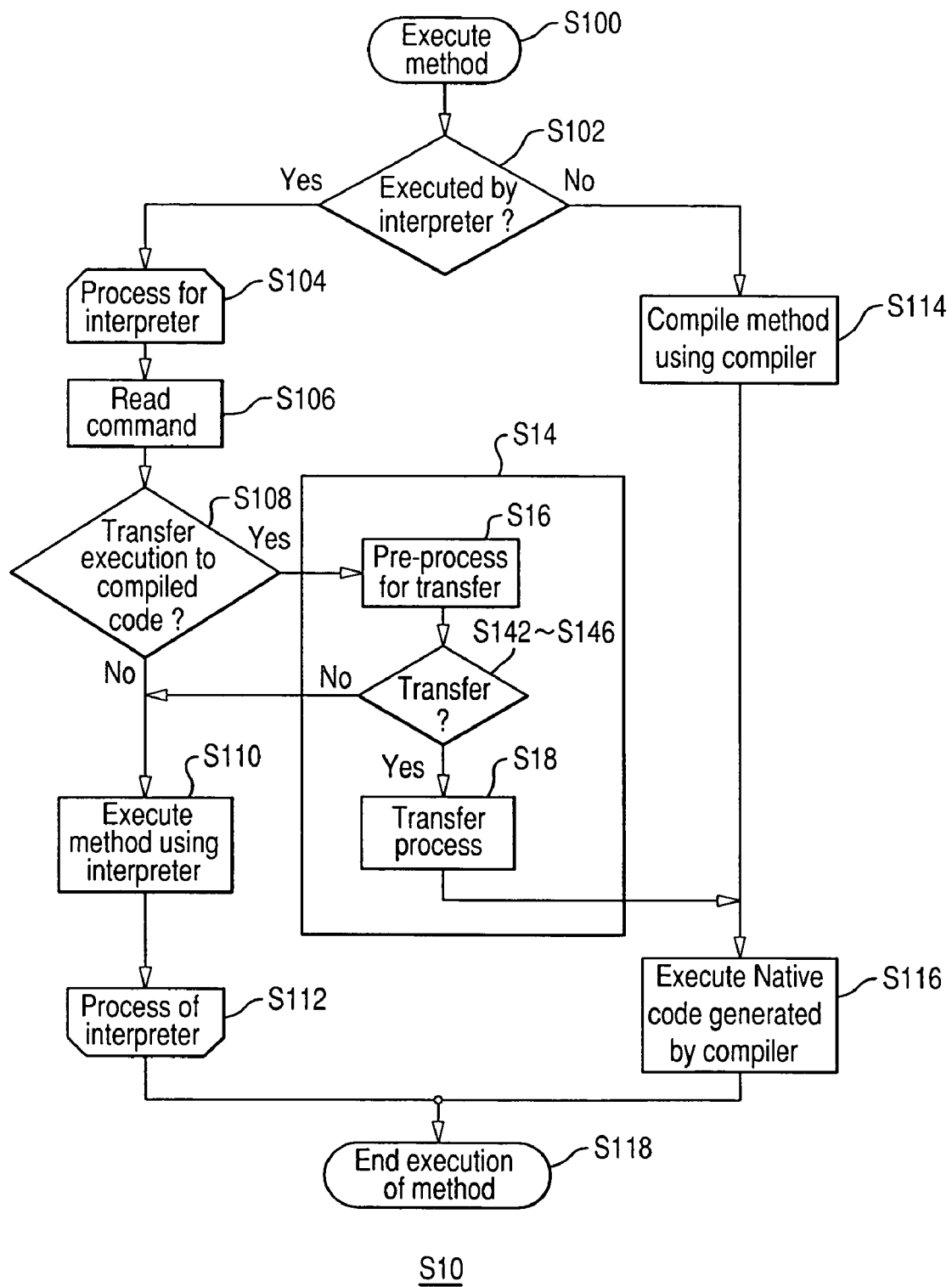
FIG. 2 is a first flowchart showing the processing performed by the program execution apparatus according to the present invention.

The present invention is positioned as the process at S14 in the bytecode execution process (S10 in FIG. 2).

As is shown in FIG. 2, at step 100 (S100), the program execution apparatus 1 executes a method.

At step 102 (S102), the program execution apparatus 1 determines whether the method should be executed by the interpreter. When the method is to be executed by the interpreter, program control advances to S104. In the other case, program control is shifted to S114.

At step 104 (S104), the program execution apparatus 1 begins the processing using the interpreter.

At step 106 (S106), the program execution apparatus 1 reads a command.

At step 108 (S108), the program execution apparatus 1 determines whether compiled code is to be executed. When the code is to be executed, program control advances to S16 in S14. In the other case, program control is shifted to S110.

At step 110 (S110), the program execution apparatus 1 uses the interpreter to execute the code.

At step 112 (S12), the program execution apparatus 1 terminates the process that was using the interpreter. The process S10 thereafter terminates at step 118 (S118).

At step 114 (S114), the program execution apparatus 1 uses the compiler to compile the method.

At step 116 (S116), the program execution apparatus 1 executes the native code that the compiler generated. The process S10 thereafter terminates at step 118 (S118).

Figure 3:
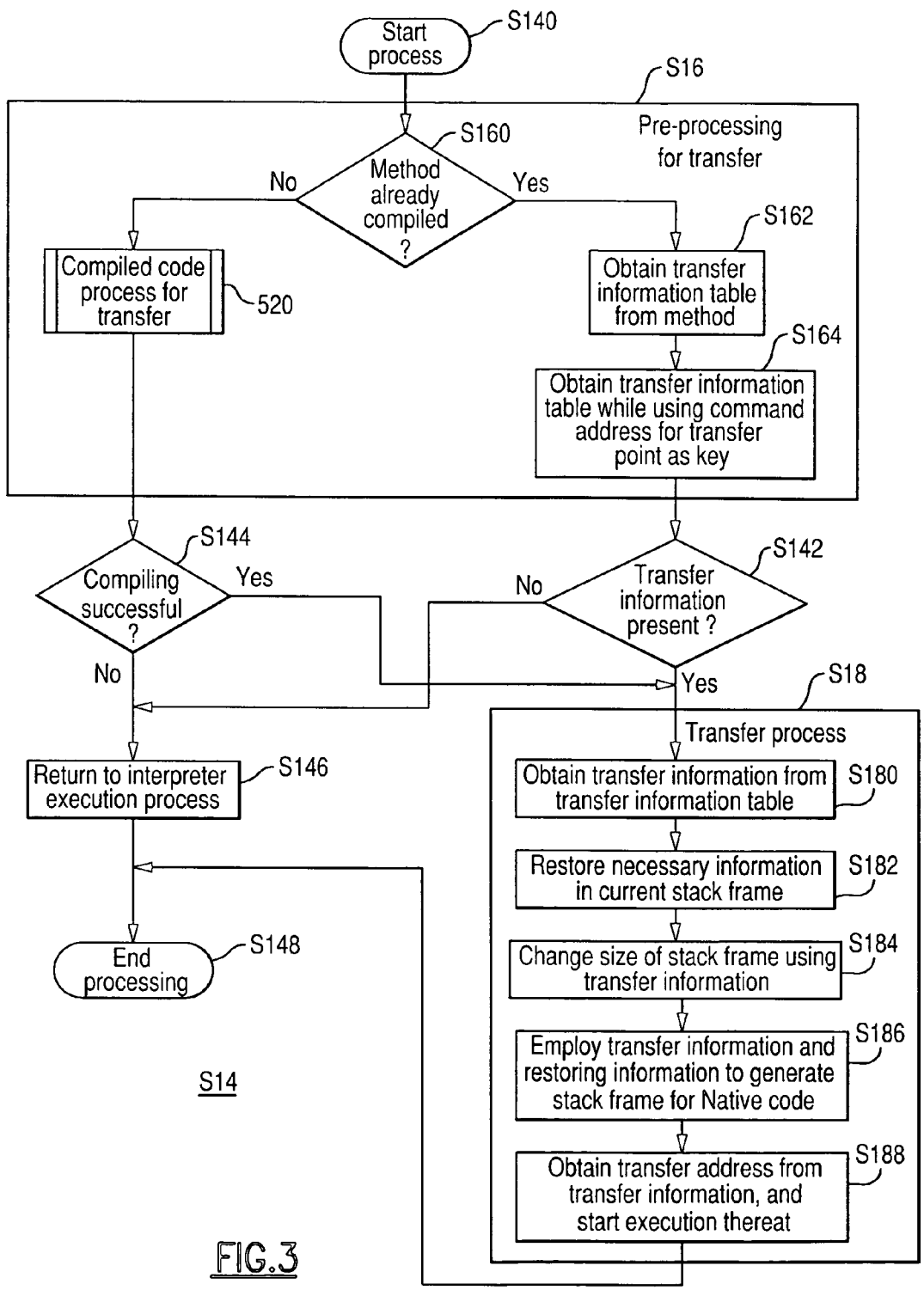
FIG. 3 is a second flowchart showing the processing performed by the program execution apparatus according to the present invention.

FIG. 3 is a flowchart showing the process at S14 according to the present invention. The process starts at step 140 (S140).

As is shown in FIG. 3, at step 160 (S160) during the preprocessing (S16) for a transfer that is included in S14, the program execution apparatus 1 determines whether the method has been compiled. If the method has been compiled, program control advances to S162. In the other case, program control is shifted to S20, which will be described later while referring to FIGS. 4 to 8.

At step 162 (S162), the program execution apparatus 1 obtains the transfer information table from the method.

At step 164 (S164), the program execution apparatus 1 examines the transfer data table, while using as a key the command address for the transfer point.

At step 142 (S142), the program execution apparatus 1 determines whether the transfer information is present. If the transfer information is present, program control advances to the transfer process (S18). In the other case, program control is shifted to S146.

At step 144 (S144), the program execution apparatus 1 determines whether the compiling performed at S20 was successful. If the compiling was performed successfully, program control advances to S18. In the other case, program control is shifted to S146.

At step 146 (S146), the program execution apparatus 1 returns to the execution process for which the interpreter is used.

At step 148 (S148), the program execution apparatus 1 terminates the processing.

At step 180 (S180) of the transfer process (S18), the program execution apparatus 1 obtains the transfer information from the transfer information table.

At step 182 (S182), the program execution apparatus 1 restores necessary information in a current stack frame.

At step 184 (S184), the program execution apparatus 1 changes the size of the stack frame by using the transfer information.

At step 186 (S186), the program execution apparatus 1 generates a stack frame for native code by using the transfer information and the restoring information.

At step 188 (S188), the program execution apparatus 1 obtains a transfer address by using the transfer information, and begins execution of the program. After the execution of the program has been completed, the program execution apparatus 1 terminates the processing (S148).

Figure 4:
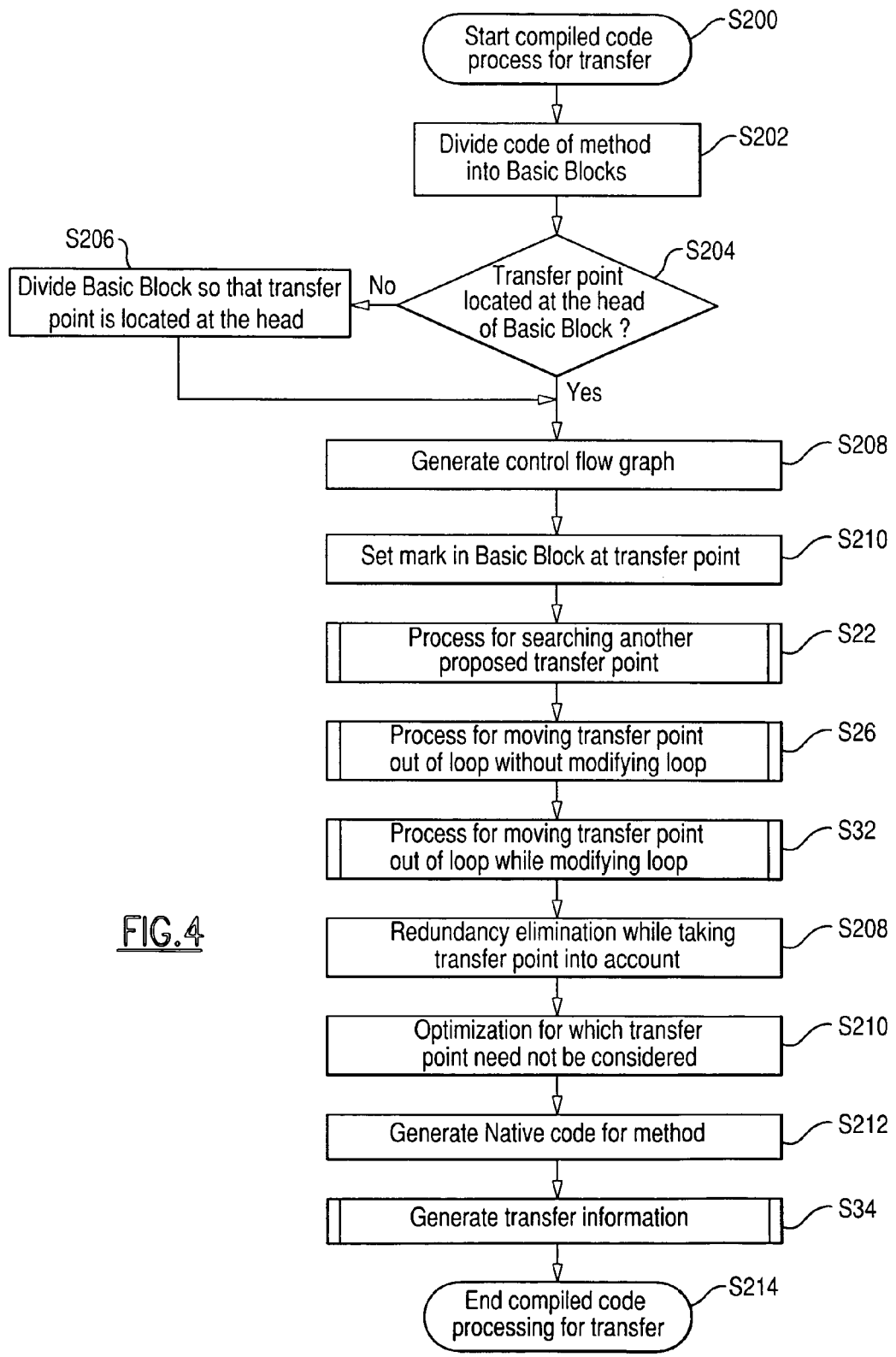
FIG. 4 is a third flowchart showing the processing performed by the program execution apparatus according to the present invention.

FIG. 4 is a flowchart showing the compiled code process (S20) for a transfer shown in FIG. 3. The process starts at step 200 (S200).

At step 202 (S202) in S20, the program execution apparatus 1 divides the code of the method into basic blocks.

At step 204 (S204), the program execution apparatus 1 determines whether a transfer point is the head of the basic block. If the transfer point is the head, program control advances to S208. In the other case, program control is shifted to S206.

At step 206 (S206), the program execution apparatus 1 divides the basic block so that the transfer point is located at its head.

At step 208 (S208), the program execution apparatus 1 generates a control flow graph.

Figure 5:
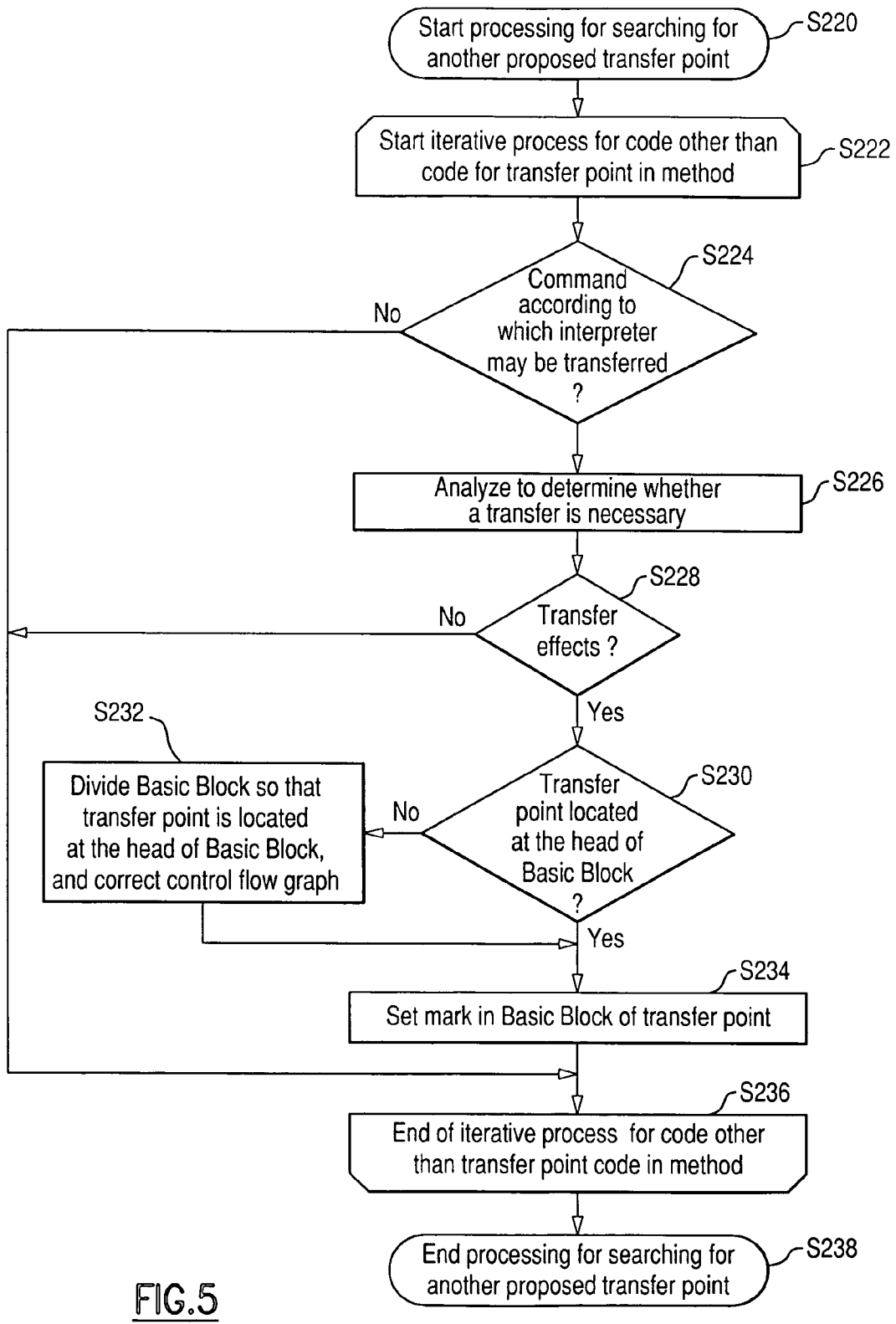
FIG. 5 is a fourth flowchart showing the processing performed by the program execution apparatus according to the present invention.

At step 210 (S210), the program execution apparatus 1 sets a mark in the basic block headed by the transfer point, and advances to the processing for searching for another proposed transfer point (S22 in FIG. 5).

FIG. 5 is a flowchart showing the processing (S22) performed in FIG. 4 when another proposed transfer point is searched for. The processing starts at step 220 (S220).

As is shown in FIG. 5, at step 222 (S222) in S22, the program execution apparatus 1 initiates an iteration process for code other than the transfer point in the method.

At step 224 (S224), the program execution apparatus 1 determines whether the process may be transferred from the interpreter. If such an action is not possible, program control advances to S226. In the other case, program control is shifted to S236.

At step 226 (S226), the controlling program analyzes the need for a transfer.

At step 228 (S228), the program execution apparatus 1 determines whether noticeable transfer effects can be provided. If noticeable effects can be provided by the transfer, program control advances to S230. In the other case, program control is shifted to S232.

At step 230 (S230), the program execution apparatus 1 determines whether the transfer point is located at the head of the basic block. If the transfer point is located at the head, program control advances to S234. In the other case, program control is shifted to S232.

At step 232 (S232), the program execution apparatus 1 divides the basic block so that the transfer point is located at the head of the basic block, and corrects the control flow graph.

At step 234 (S234), the program execution apparatus 1 sets a mark in the basic block of the transfer point.

At step 236 (S236), the program execution apparatus 1 terminates the iteration process for code other than the transfer point in the method.

At step 238 (S238), the program execution apparatus 1 terminates the processing at S22, and performs the processing (S26 in FIG. 6) for moving the transfer point outside the loop, without modifying the loop.

Figure 6A:
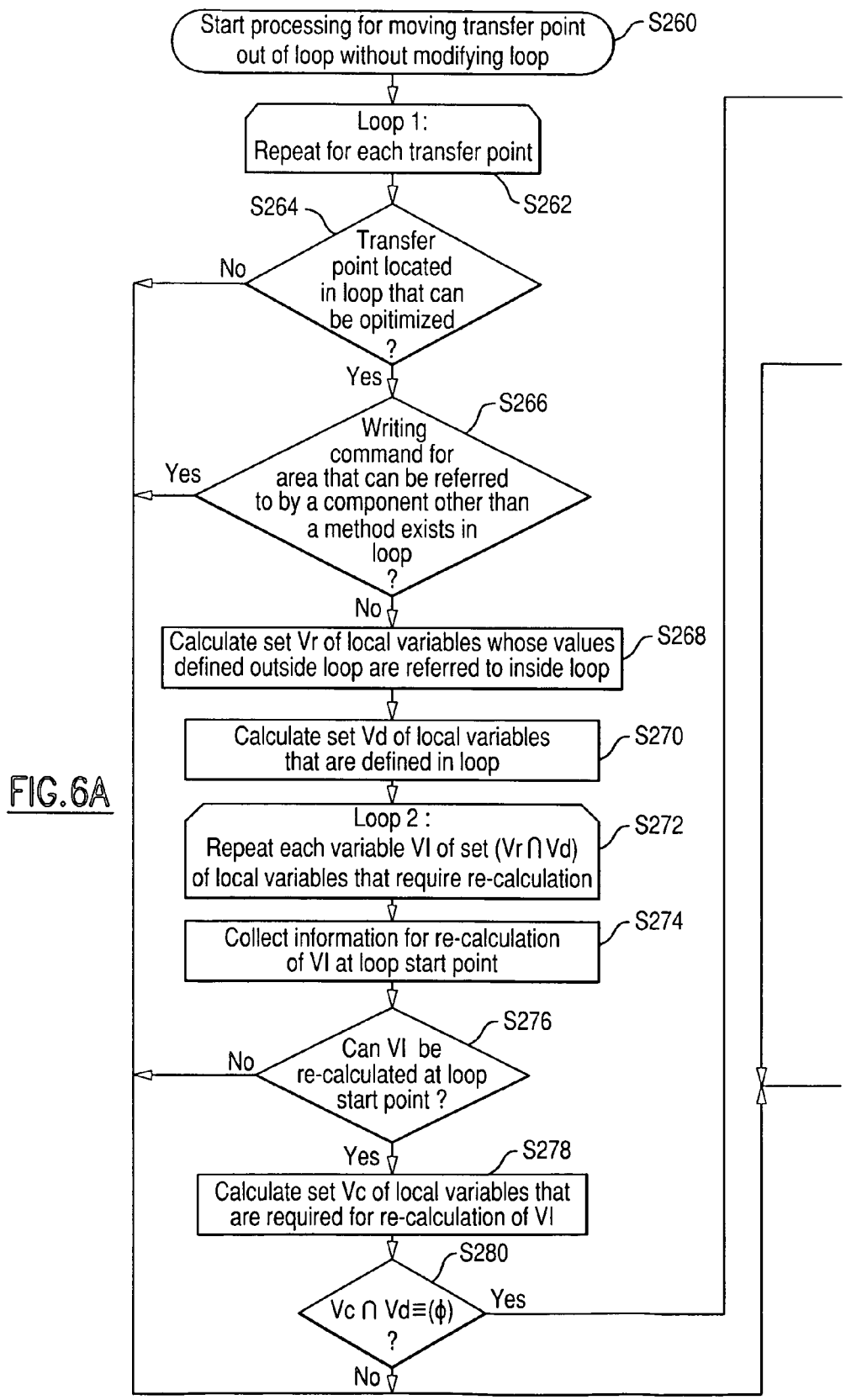
FIG. 6 is a fifth flowchart showing the processing performed by the program execution apparatus according to the present invention.
Figure 6B:
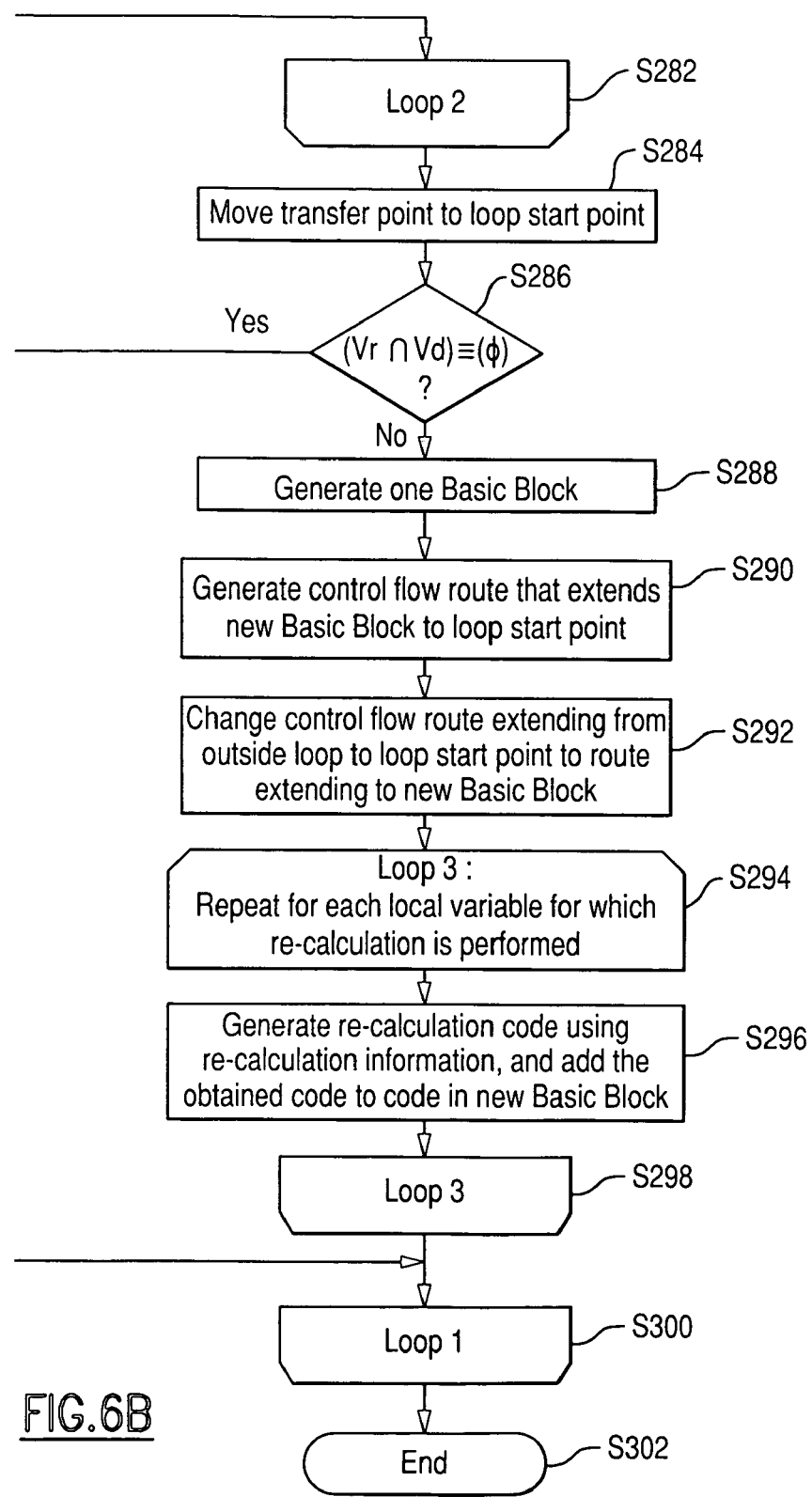

FIG. 6 is a flowchart showing the processing (S26) used to move the transfer point outside the loop, without modifying the loop in FIG. 4. The processing starts at step 260 (S260).

As is shown in FIG. 6, at step 262 (S262) in S26, for each transfer point the program execution apparatus 1 repeats up to S300 the processing for loop 1.

At step 264 (S264), the program execution apparatus 1 determines whether the transfer point is located in a loop that can be optimized. If the transfer point is located in such a loop, program control advances to S266. In the other case, program control is shifted to S300.

At step 266 (S266), the program execution apparatus 1 determines whether there is a writing command in the loop for an area that can be referred to by a component other than the method. If such a writing command is present in the loop, program control is shifted to S300. In the other case, program control advances to S268.

At step 268 (S268), the program execution apparatus 1 calculates a set Vr of local variables whose values, which are defined outside the loop, are referred to in the loop.

At step 270 (S270), the program execution apparatus 1 calculates a set Vd of local variables that are defined in the loop.

At step 272 (S272), the program execution apparatus 1 repeats the processing for loop 2 up to S282 for each variable VI in a set (Vr∩Vd) of local variables that require recalculation.

At step 274 (S274), the program execution apparatus 1 collects information required for a recalculation of the variable VI at the loop start point.

At step 276 (S276), the program execution apparatus 1 determines whether recalculation of the variable VI can be performed at the loop start point. If recalculation of the variable VI can be performed, program control advances to S278. In the other case, program control is shifted to S300.

At step 278 (S278), the program execution apparatus 1 calculates a set Vc of local variables that are required for a recalculation of the variable VI.

At step 280 (S280), the program execution apparatus 1 determines whether the set (Vr∩Vd) is empty. If the set (Vr∩Vd) is empty, program control advances to S282. In the other case, program control is shifted to S300.

At step 284 (S284), the program execution apparatus 1 moves the transfer point to the loop start point.

At step 286 (S286), the program execution apparatus 1 determines whether the set (Vr∩Vd) is empty. If the set (Vr∩Vd) is empty, program control advances to S300. In the other case, program control is shifted to S288.

At step 288 (S288), the program execution apparatus 1 generates one basic block.

At step 290 (S290), the program execution apparatus 1 generates a route for a control flow that extends from the newly generated basic block to the loop start point.

At step 292 (S292), the program execution apparatus 1 changes the route leading from outside the loop to the loop start point into a route that leads to the newly generated basic block.

At step 294 (S294), the program execution apparatus 1 repeats for recalculation of each local variable the processing extending from loop 3 up to S298.

At step 296 (S296), the program execution apparatus 1 generates recalculation code using the recalculation information, and adds the obtained code to the code in the newly generated basic block.

At step 302 (S302), by modifying the loop, the program execution apparatus 1 advances to the processing (S32 in FIG. 7) for moving the transfer point to a position outside the loop.

Figure 7:
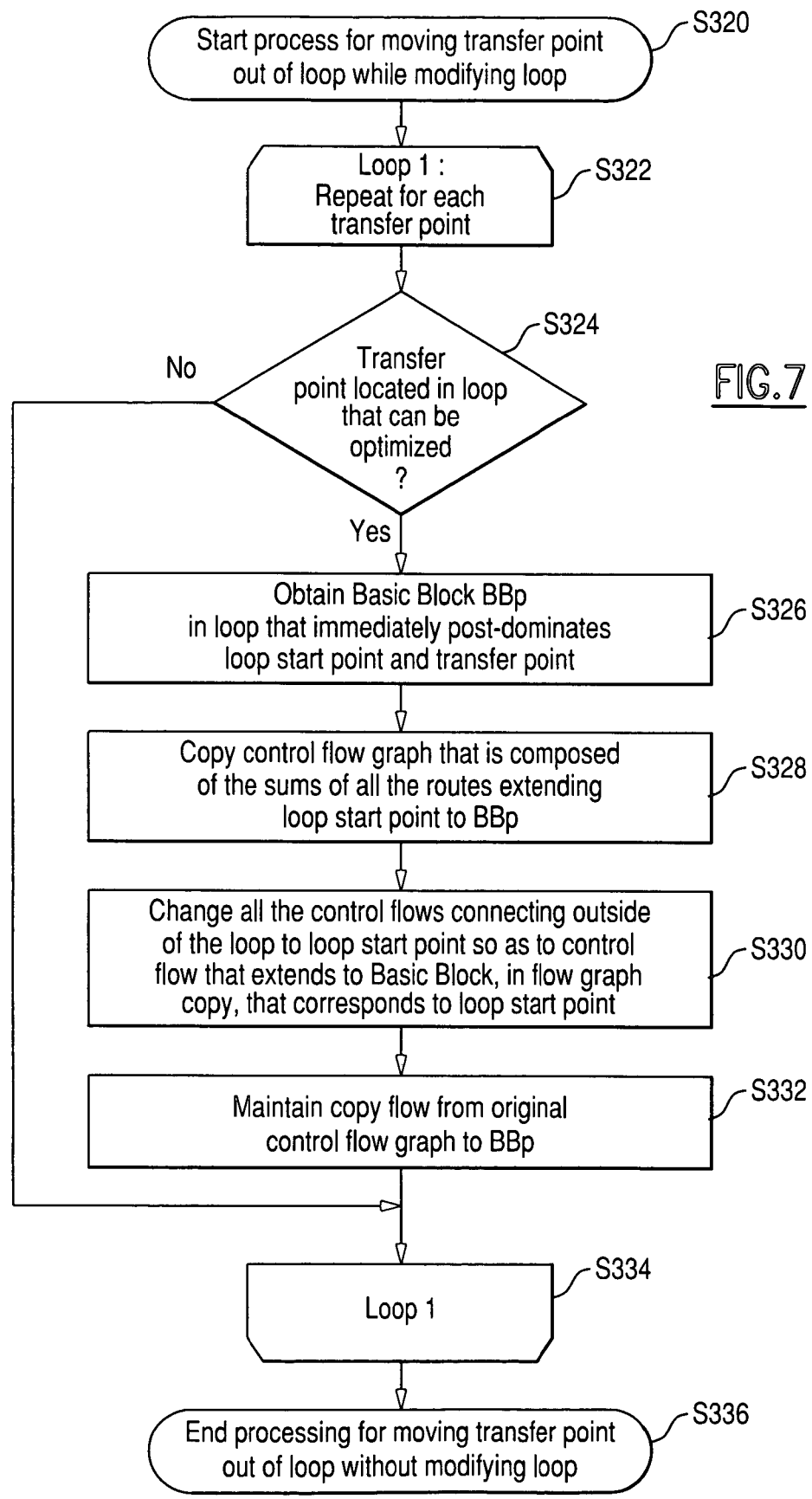
FIG. 7 is a sixth flowchart showing the processing performed by the program execution apparatus according to the present invention.

FIG. 7 is a flowchart showing the processing (S32) for using the loop modification shown in FIG. 4 to move the transfer point outside the loop. The processing starts at step 320 (S320).

As is shown in FIG. 7, at step 322 (S322) in S32, for each transfer point the program execution apparatus 1 repeats the processing for loop 1 up to S334.

At step 324 (S324), the program execution apparatus 1 determines whether the transfer point is located in a loop that can be optimized. If the transfer point is located in such a loop, program control advances to S286. In the other case, program control is shifted to S334.

At step 326 (S326), the program execution apparatus 1 obtains a basic block BBp in a loop that immediately post-dominates the loop start point and the transfer point.

At step 328 (S328), the program execution apparatus 1 copies a control flow graph that is formed using the sum of the routes from the loop start point to the basic block BBp.

At step 330 (S330), the program execution apparatus 1 changes all the control flows that extend from outside the loop to the loop start point into control flows in a flow graph copy that extends to the basic block that corresponds to the loop start point.

At step 332 (S332), the program execution apparatus 1 maintains the control flows extending from the original control flow graph to the basic block BBp.

At step 336 (S336), the program execution apparatus 1 returns to S208 in S20 in FIG. 4.

An explanation for the processing will be given by referring again to FIG. 4.

At step 208 (S208), while taking a transfer point into account, the program execution apparatus 1 performs redundancy elimination.

At step 210 (S210), the program execution apparatus 1 performs optimization for which a transfer point need not be taken into account.

At step 212 (S212), the program execution apparatus 1 generates native code for the method, and advances to the processing (S34 in FIG. 8) for generating transfer information. The process S20 thereafter terminates at step 214 (S214).

Figure 8:
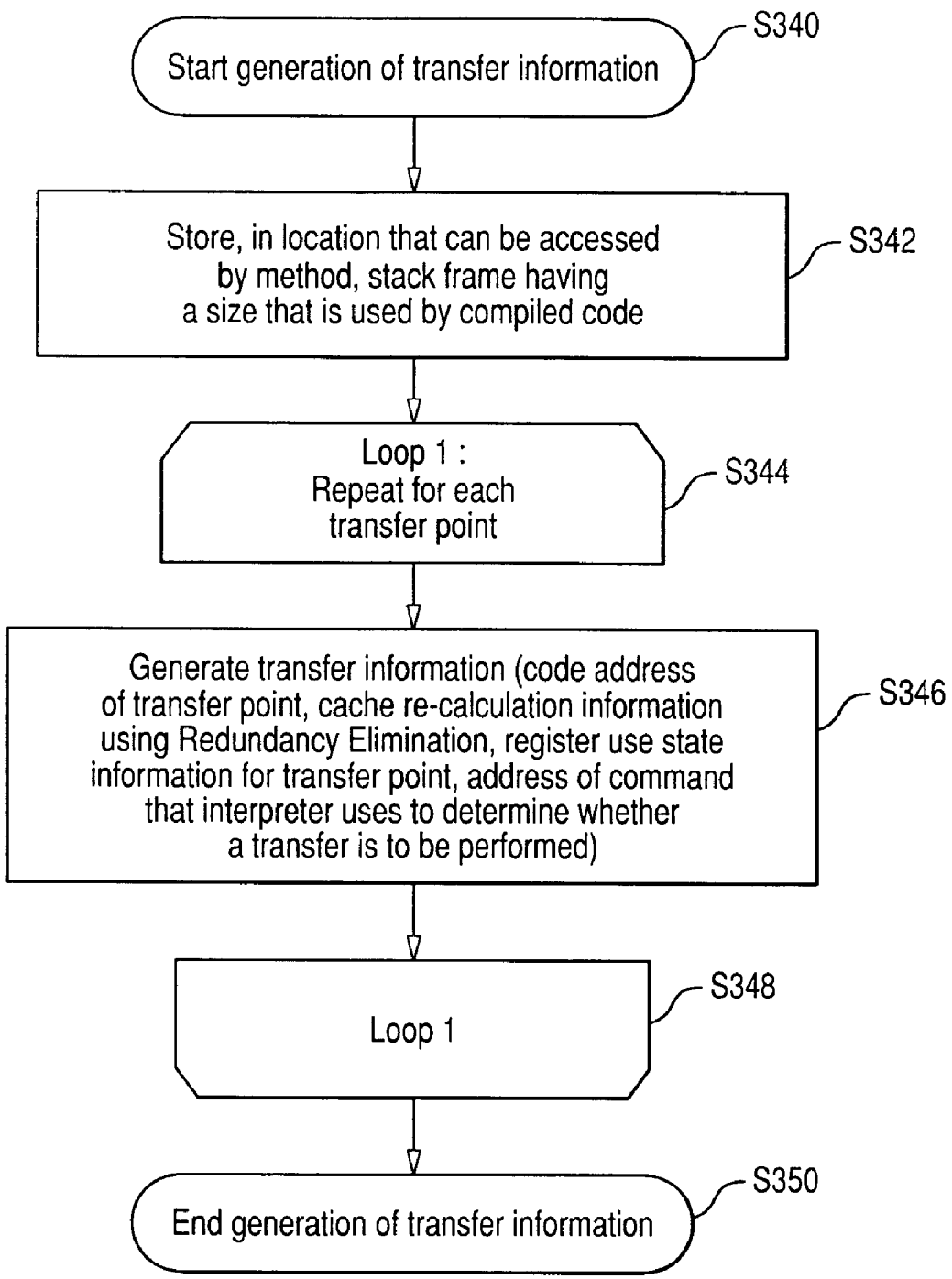
FIG. 8 is a seventh flowchart showing the processing performed by the program execution apparatus according to the present invention.

FIG. 8 is a flowchart showing the processing (S34) for generating transfer information in FIG. 4. The processing starts at step 340 (340).

At step 342 (S342) in S34, the program execution apparatus 1 stores a stack frame, having the size that is required by the compiled code, at a location that can be accessed by the method.

At step 344 (S344), the program execution apparatus 1 repeats for each transfer point the processing performed up to S348 for loop 1.

At step 346 (S346), the program execution apparatus 1 generates transfer information (the code address of a transfer point, cache recalculation information obtained by redundancy elimination, register use state information for a transfer point, and the address of a command by which the interpreter determines whether a transfer is to be made).

At step 350 (S350), the program execution apparatus 1 returns to S144 in FIG. 3.

Effects Provided by the Program Execution Apparatus 1

A "method whereby the performance is greatly affected by transferring the program execution in the middle of the processing" that is optimized by the program execution apparatus 1 is, for example, a method that includes an endless loop, or a method wherein multiple iterations of a loop are performed that produce a difference in the priorities existing between the execution of the interpreter and the execution of the compiled code.

The code must be scanned before the execution in order to examine, without program execution, whether a loop is included. However, when there is a great amount of code, the time required for the scanning may cause the performance to be deteriorated.

While executing the program, the program execution apparatus 1 can detect a loop without scanning being required, and can transfer the interpreter to the compiled code to enable fast processing.

Generally, at an arbitrary point the interpreter is transferred to the compiled code, and in situations where transfers should be performed, in most cases transfer points are present in loops. However, since it is difficult to optimize a loop in which there is a transfer point, the processing for moving the transfer point outside the loop is an important performance enhancing procedure.

ADVANTAGES OF THE INVENTION

As is described above, according to the program execution method of the invention, even when a transfer point is present in a program to be changed, higher optimization extending across the transfer point can be performed.

In addition, according to the program execution method of this invention, in a multithreaded environment, even when an interpreter is transferred to compiled code at a plurality of transfer points, a plurality of compiled code processes are not required, and generated codes do not overlap.

What is claimed is:

1. A program execution method for transferring, from an interpreter process to a loop process of a compiled code process, a method that is currently being executed for code that includes one or more transfer points at which program execution is transferred from the interpreter process to said loop process of the compiled code process, comprising the steps of:

optimizing the loop process, said optimizing step including the steps of:

moving said one or more transfer points to the top of said loop process if they can be moved there without a problem occurring;

copying code from the top of the loop process to a point that post-dominates said top of said loop process and said one or more transfer points to a location immediately preceding said loop process if said transfer points are located inside said loop process;

storing information for generating recalculation code for one or more specific transfer points when privatization, common sub-expression elimination, and moving of code that are performed pass beyond said specific transfer points; and performing a recalculation during a transfer process; and transferring execution from the interpreter process to the optimized loop process via one of said transfer points.

2. The program execution method according to claim 1 further comprising the step of:

defining as a new transfer point, a point from said interpreter process to said compiled code process whereat, when said method that is currently being executed is replaced, the execution speed is increased compared with when said method is not replaced.

3. The program execution method according to claim 1 or 2, further comprising the steps of:
generating information required to perform a transfer from said interpreter process to said compiled code process; and
storing said generated information while correlating said generated information with said transfer points,
wherein, at said recalculation step, said information stored for said transfer points is employed.

4. A program storage device readable by a machine, tangibly embodying a program of instructions executable by the machine to perform method steps for transferring, from an interpreter process to a loop process of a compiled code process, a method that is currently being executed for code that includes one or more transfer points at which program execution is transferred from the interpreter process to said loop process of the compiled code process, the method steps comprising:
optimizing the loop process, said optimizing step including the steps of
moving said one or more transfer points to the top of said loop process if they can be moved there without a problem occurring;
copying code from the top of the loop process to a point that post-dominates said top of said loop process and said one or more transfer points to a location immediately preceding said loop process if said transfer points are located inside said loop process;
storing information for generating recalculation code for one or more specific transfer points when privatization, common sub-expression elimination, and moving of code that are performed pass beyond said specific transfer points; and
performing a recalculation during a transfer process; and
transferring execution from the interpreter process to the optimized loop process via one of said transfer points.

5. A program execution method for transferring, from an interpreter process to a loop process of a compiled code process, a method that is currently being executed for code that includes one or more transfer points at which program execution is transferred from the interpreter process to said loop process of the compiled code process, comprising the steps of:
optimizing the loop process, said optimizing step including the step of moving said one or more transfer points to the top of said loop process if they can be moved there without a problem occurring; and
transferring execution from the interpreter process to the optimized loop process via one of said transfer points.

6. The program execution method according to claim 5, said optimizing step further including the step of:
copying code from the top of the loop process to a point that post-dominates said top of said loop process and said one or more transfer points to a location immediately preceding said loop process if said transfer points are located inside said loop process.

7. A program execution method for transferring, from an interpreter process to a loop process of a compiled code process, a method that is currently being executed for code that includes one or more transfer points at which program execution is transferred from the interpreter process to said loop process of the compiled code process, comprising the steps of:
optimizing the loop process, said optimizing step including the step of copying code from the top of the loop process to a point that post-dominates said top of said loop process and said one or more transfer points to a location immediately preceding said loop process if said transfer points are located inside said loop process; and
transferring execution from the interpreter process to the optimized loop process via one of said transfer points.

8. A program storage device readable by a machine, tangibly embodying a program of instructions executable by the machine to perform method steps for transferring, from an interpreter process to a loop process of a compiled code process, a method that is currently being executed for code that includes one or more transfer points at which program execution is transferred from the interpreter process to said loop process of the compiled code process, the method steps comprising:
optimizing the loop process, said optimizing step including the step of moving said one or more transfer points to the top of said loop process if they can be moved there without a problem occurring; and
transferring execution from the interpreter process to the optimized loop process via one of said transfer points.

9. The program storage device of claim 8, said optimizing step further including the step of:
copying code from the top of the loop process to a point that post-dominates said top of said loop process and said one or more transfer points to a location immediately preceding said loop process if said transfer points are located inside said loop process.

10. A program storage device readable by a machine, tangibly embodying a program of instructions executable by the machine to perform method steps for transferring, from an interpreter process to a loop process of a compiled code process, a method that is currently being executed for code that includes one or more transfer points at which program execution is transferred from the interpreter process to said loop process of the compiled code process, the method steps comprising:
optimizing the loop process, said optimizing step including the step of copying code from the top of the loop process to a point that post-dominates said top of said loop process and said one or more transfer points to a location immediately preceding said loop process if said transfer points are located inside said loop process; and
transferring execution from the interpreter process to the optimized loop process via one of said transfer points.

* * * * *

UNITED STATES PATENT AND TRADEMARK OFFICE
CERTIFICATE OF CORRECTION

| | | |
|---|---|---|
| PATENT NO. | : 7,665,079 B1 | Page 1 of 1 |
| APPLICATION NO. | : 09/708159 | |
| DATED | : February 16, 2010 | |
| INVENTOR(S) | : Yasue et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1895 days.

Signed and Sealed this

Seventh Day of December, 2010

David J. Kappos
*Director of the United States Patent and Trademark Office*